US012391205B2

(12) United States Patent
Mauffrey et al.

(10) Patent No.: US 12,391,205 B2
(45) Date of Patent: Aug. 19, 2025

(54) VEHICLE SEAT BACK PROVIDED WITH AN AIRBAG DEVICE AND METHOD OF ASSEMBLY SUCH A SEAT BACK

(71) Applicant: FAURECIA Sièges d'Automobile, Nanterre (FR)

(72) Inventors: Jean-Marie Mauffrey, Champagney (FR); Didier Fouinat, Saint Cheron (FR); Didier Duriez, Le Plessis-Pâté (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 293 days.

(21) Appl. No.: 17/989,078

(22) Filed: Nov. 17, 2022

(65) Prior Publication Data
US 2023/0158989 A1  May 25, 2023

(30) Foreign Application Priority Data

Nov. 19, 2021 (FR) ..................................... 2112283

(51) Int. Cl.
B60R 21/207 (2006.01)
(52) U.S. Cl.
CPC .................................. B60R 21/207 (2013.01)
(58) Field of Classification Search
CPC ............................ B60R 21/207; B60N 2/4235
See application file for complete search history.

(56) References Cited

U.S. PATENT DOCUMENTS

| 6,109,645 A * | 8/2000 | Totani ................. B60R 21/2165 280/732 |
| 6,612,610 B1 * | 9/2003 | Aoki ..................... B60R 21/201 280/730.2 |
| 2006/0163850 A1 | 7/2006 | Inazu |
| 2007/0187933 A1 | 8/2007 | Tracht |
| 2013/0175792 A1 | 7/2013 | Fukawatase |
| 2018/0319301 A1 | 11/2018 | Haby |

FOREIGN PATENT DOCUMENTS

| DE | 102005051171 A1 | 4/2007 |
| DE | 102006007301 A1 | 8/2007 |

OTHER PUBLICATIONS

German Search Report for counterpart German Patent App. No. DE102022129380.2 dated Jun. 26, 2023, 18 pages.
French Preliminary Search Report for FR2112283 dated Jul. 11, 2022, 4 pages, No English Translation Available.

* cited by examiner

Primary Examiner — Timothy J Brindley
(74) Attorney, Agent, or Firm — Barnes & Thornburg LLP

(57) ABSTRACT

A vehicle seat back comprising a seat back frame with a pillar, an airbag device and a side airbag, the airbag device comprising at least one airbag and an airbag support for attaching the airbag to the seat back frame, and the side airbag comprising a side airbag trim and at least one side airbag trim support for attaching the side airbag to the seat back frame, wherein the trim support and the airbag support comprise at least one assembly point for their attachment to the pillar of the seat back frame.

12 Claims, 4 Drawing Sheets

Figure 1:
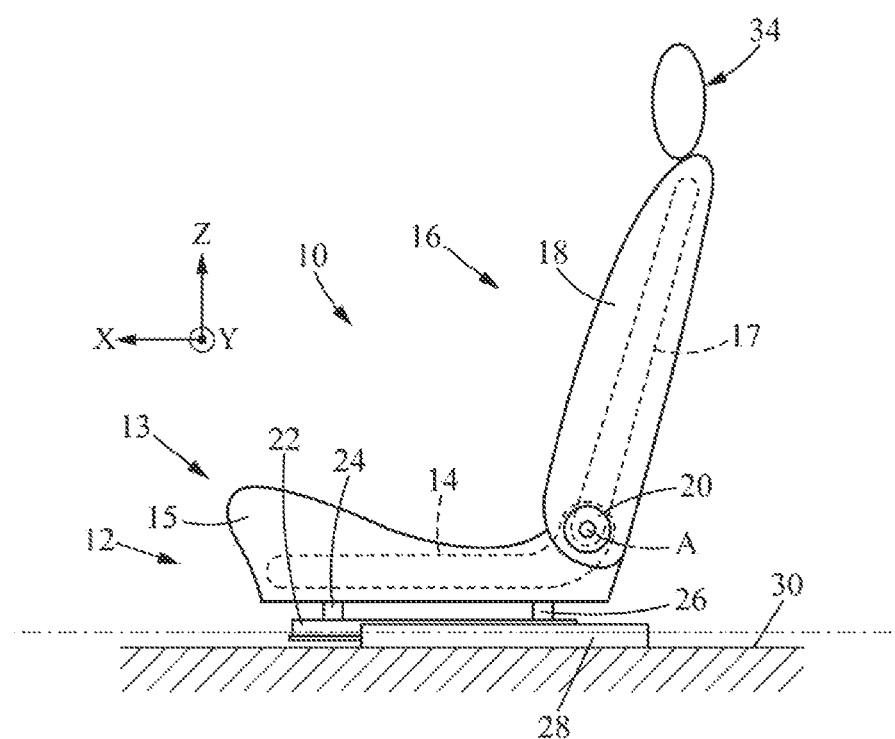

VEHICLE SEAT BACK PROVIDED WITH AN AIRBAG DEVICE AND METHOD OF ASSEMBLY SUCH A SEAT BACK

PRIORITY CLAIM

This application claims priority to French Patent Application No. FR2112283, filed Nov. 19, 2021, which is expressly incorporated by reference herein.

BACKGROUND

The present disclosure relates to a vehicle seat back, in particular a motor vehicle seat back. A method for assembling such a seat back as well as a vehicle seat comprising such a seat back are also described.

SUMMARY

According to the present disclosure, a vehicle seat back comprises a seat back frame with a pillar, an airbag device and a side bolster, the airbag device comprising at least one airbag and an airbag support for attaching the airbag to the seat back frame, and the side bolster comprising a side bolster trim and at least one side bolster trim support for attaching the side bolster to the seat back frame, wherein the trim support and the airbag support comprise at least one assembly point for their attachment to the pillar of the seat back frame.

In illustrative embodiments, the assembly point may be common to the trim support and the airbag support for their joint attachment to the pillar of the seat back frame.

Thus, advantageously, the assembly formed by the trim support and the airbag support, and therefore more generally by the side bolster, including the trim of the side bolster and the airbag device, is assembled more easily due to the presence of the at least one common assembly point.

In illustrative embodiments, the vehicle seat back comprises one or more of the following features, taken alone or in combination:
 the trim support, at least at the assembly point, is arranged between the pillar of the seat back frame and the airbag support,
 the trim support and the airbag support are attached to the seat back frame, at the assembly point, by common attachment means,
 the trim support and the airbag support comprise, for their attachment on the pillar of the seat back frame, two common assembly points: a first point for an upper attachment on the pillar and a second point for a lower attachment on the pillar, the upper attachment being arranged higher than the lower attachment in a vertical direction,
 the seat back may further comprise a deflector attached to the pillar, the deflector comprising the two assembly points common to the trim support and the airbag support,
 the side bolster trim comprises a run-off line for airbag deployment
 the deflector further comprises a border, the border being arranged along the run-off line and diverging from the run-off line for the deployment of the airbag between the border and the run-off line,
 the trim support comprises a guide wall configured to direct the deployment of the airbag toward the run-off line,
 the trim support and the airbag support comprise different materials, the trim support preferably being made of plastic material and the airbag support being made of metallic materials.

In illustrative embodiments, a method of assembling a vehicle seat back comprising a seat back frame, an airbag device comprising at least one airbag and an airbag support for attaching the airbag, and a side bolster comprising a side bolster trim and at least one side bolster trim support (40) for its attachment to the seat back frame, the method comprising:
 preassembling the airbag support of the airbag device with the trim support of the side bolster,
 attaching the assembly formed, on the one hand, by the side bolster comprising the side bolster trim and the trim support, and on the other hand the airbag device on the seat back frame, by at least one assembly point for attaching the trim support and the airbag support to the seat back frame pillar.

Furthermore, the assembly point may be common to the trim support and the airbag support, and the method may comprise:
 preassembling the airbag support of the airbag device with the trim support of the side bolster, comprises matching the common assembly point between the trim support and the airbag support.

Additionally, the seat back may comprise a deflector, the method further comprising:
 preassembling the deflector on the assembly formed, on the one hand, by the side bolster comprising the side bolster trim and the trim support and, on the other hand, the airbag device,
 attaching the assembly formed by the side bolster, the airbag device and the deflector on the seat back frame by the at least one common assembly point of the trim support and the airbag support for their attachment on the pillar of the seat back frame.

In illustrative embodiments, also disclosed is a motor vehicle seat comprising a seat bottom with a seat bottom frame and a seat back as described above.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
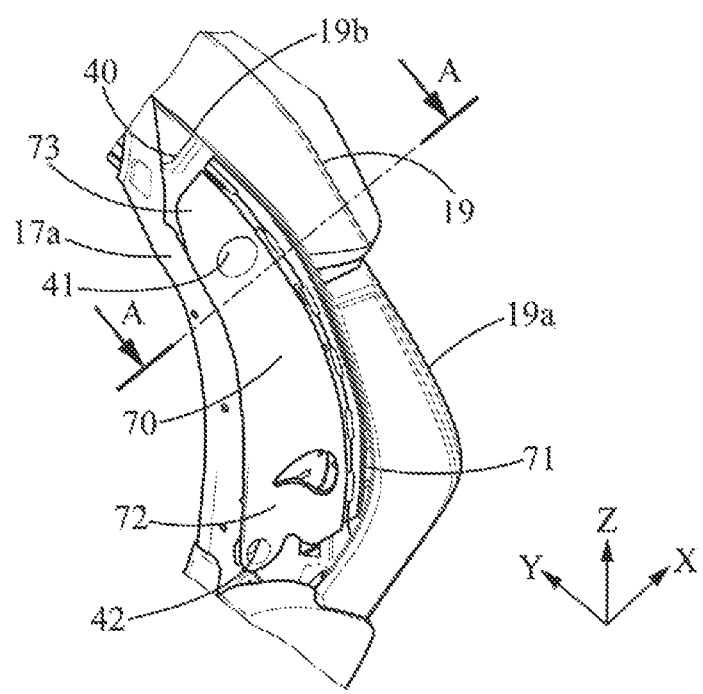
Figure 3:
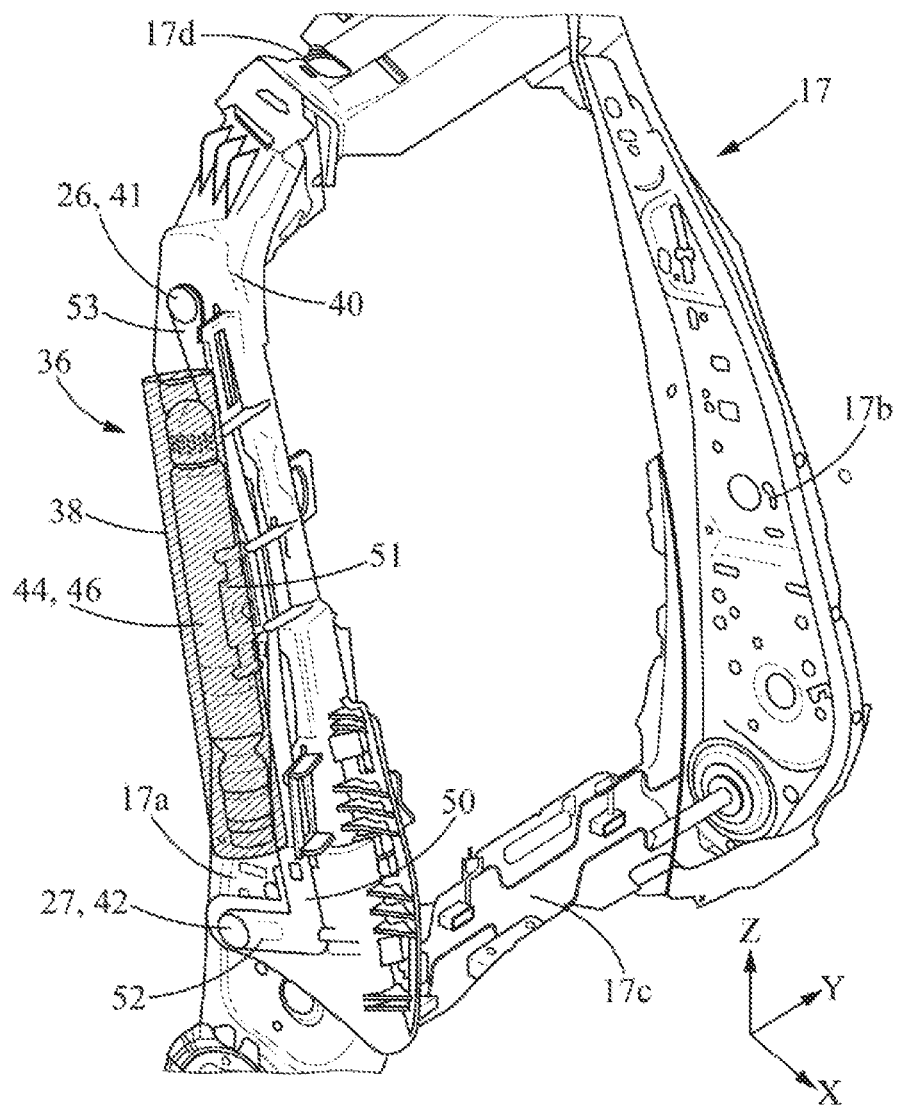
Figure 4:
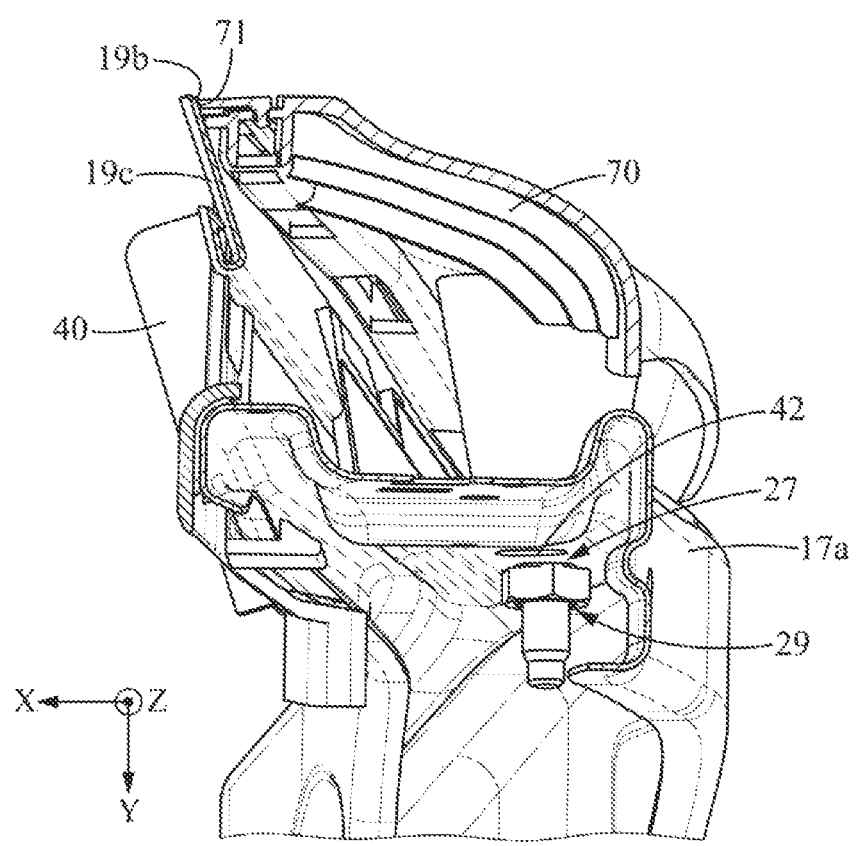

The detailed description particularly refers to the accompanying figures in which:
 FIG. 1 schematically shows a side view of an example of a vehicle seat;
 FIG. 2 schematically shows a side view of an example of a side part of a vehicle seat;
 FIG. 3 schematically shows, in perspective view, an example of a seat back frame equipped with an example of a side airbag device, which can be implemented in the vehicle seat of FIG. 1; and
 FIG. 4 schematically shows a sectional view along the axis A-A of the vehicle seat example of FIG. 2.

DETAILED DESCRIPTION

In the various figures, the same references designate identical or similar elements. For the sake of conciseness, only the elements that are useful for understanding the described embodiment are shown in the figures and are described in detail below.

In the following description, when referring to absolute position qualifiers, such as "front," "rear," "top," "bottom," "left," "right," etc., or relative position qualifiers, such as "above," "below," "upper," "lower," etc., or to qualifiers of orientation, such as "horizontal," "vertical," etc., reference is made, unless otherwise specified, to the orientation of the figures or of a vehicle seat in its normal usage position.

In particular, the longitudinal direction X means the longitudinal direction of the seat. The longitudinal direction of the seat is considered to be the same as the longitudinal direction of the motor vehicle in which the seat is mounted. This longitudinal direction X corresponds to the normal direction of advance of the vehicle. The longitudinal direction X is horizontal. The transverse direction Y of the seat thus corresponds to the transverse or lateral direction of the motor vehicle. This transverse direction corresponds to a direction perpendicular to the normal direction of advance of the vehicle. The transverse direction Y is horizontal. Finally, the vertical direction Z is a vertical direction of the seat, perpendicular to the longitudinal and transverse directions.

FIG. 1 schematically shows a motor vehicle seat 10 mounted on a slide mechanism 12.

The seat 10 comprises a seat bottom 13, with a seat bottom frame 14 and a seat bottom trim 15, on which a seat back 16, with a seat back frame 17 and a seat back trim 18, is mounted. The seat back frame 17 here is pivoting about a transverse axis A, with respect to the seat bottom frame 14. To do this, a hinge mechanism 20 is arranged between the seat bottom frame 14 and the seat back frame 17.

The seat back trim 18 may further comprise a central bolster that comprises a central trim (not shown), and of two side bolsters that respectively comprise two side bolster trims 19, and Each side bolster is arranged on the seat back frame 17, laterally, on either side of the central bolster. The trim (of the central bolster or the side bolsters) typically forms a padding, for example an expanded foam, conferring the softness and the comfort of the seat The seat bottom 13 is mounted on movable sections 22, also called slides or male sections, via feet 24, 26. Each movable section 22 is part of a slide 12 and is associated with a fixed section 28. The fixed section 28 is also called "rail" or "female section." The fixed section 28 is attached to the floor 30 of a motor vehicle.

According to the illustrated example, the seat 10 can also comprise a headrest 34. The headrest 34 may also comprise a headrest frame and headrest trim.

In the following, we provide more detailed descriptions of examples of seat backs 16 that can be implemented in the seat 10 of [FIG. 1], with reference to FIG. 2 to 4.

As illustrated in [FIG. 2], the seat back frame 17 comprises a first pillar 17a, a second pillar 17b, a first crosspiece 17c, hereinafter called "lower crosspiece 17c," and a second crosspiece 17d, hereinafter called "upper crosspiece 17d." The pillars 17a, 17b and the crosspieces 17c, 17d form a seat back frame 17 in the form of a housing. To do this, the pillars 17a, 17b and the crosspieces 17c, 17d can be attached together, in particular welded together. Alternatively, the seat back frame 17 is in one piece, the latter for example being molded.

The first pillar 17a is intended to be arranged as centrally as possible in the motor vehicle, while the second pillar 17b is intended to be arranged closest to a lateral side of the vehicle. The lower crosspiece 17c is intended to be the closest crosspiece to the hinge device 20, the hinge device even being able to be attached on the lower crosspiece 17c. The upper crosspiece 17d is intended to be the closest crosspiece to the headrest 34.

In the remainder of the description, the present disclosure is arbitrarily described with reference to the first pillar 17a. However, the present disclosure may alternatively or additionally be implemented on the second pillar 17b.

As illustrated in this [FIG. 2], the first pillar 17a comprises an upper attachment 26 and a lower attachment 27. The upper and lower attachments 26, 27 are through holes provided to receive attachment means 60, as described below. In the vertical direction Z, the upper attachment 26 is provided in the upper part of the first pillar 17a and the lower attachment 27 is provided in the lower part of the first pillar 17a, the upper attachment 26 being positioned higher than the lower attachment 27, relative to the vertical direction Z.

As illustrated in [FIG. 2] and in more detail in [FIG. 3], a side bolster is arranged on the first pillar 17a. In [FIG. 2], it can be seen that the side bolster trim 19 comprises, in the longitudinal direction X, an outer edge 19a and an inner edge 19b. The inner edge 19b is designed to be arranged in contact with, or in the immediate vicinity of, a rear part of a vehicle seat, such as for example a vehicle seat rear shell. The inner edge 19b is preferably a trim section that is attached to the trim support 40, in particular on which the seat back foam is overmolded. The inner edge 19b is also preferably arranged in line with the first pillar 17a.

In addition, advantageously, the inner edge 19b of the side bolster trim 19 can constitute a run-off line for a side bolster device 36 (detailed below). Alternatively, the run-off line (inner edge 19b) can be completed by a guide wall or inclined wall 19c. The guide wall 19c, visible in the sectional view of [FIG. 4] along the axis A-A illustrated in [FIG. 2], directs the deployment of an airbag of the side bolster device 36 toward the run-off line. This wall 19c is produced by a trim section of the seat back side bolster, which preferably belongs to a trim support 40. The wall 19c thus separates the airbag zone from the rear face of the foam and the seat back side bolster trim and thus provides deployment of the airbag toward the run-off line, without tearing the foam.

Furthermore, in addition to the side bolster trim 19, the side bolster comprises a trim support 40 for attaching the side bolster trim 19 on the first pillar 17a. [FIG. 3] shows the trim support 40 without the side bolster trim 19. The trim support is preferably made of plastic material. The trim support 40 is attached to the first pillar 17a via two assembly points 41, 42. More specifically, the trim support 40 is attached to the first pillar 17a via a first point 41 and a second point 42. The first point 41 is provided to cooperate with the upper attachment 26 arranged on the first pillar 17a, and the second point 42 is provided to cooperate with the lower attachment 27 arranged on the first pillar 17a. The first and second points 41, 42 cooperate with the upper 26 and lower 27 attachments, respectively, via the attachment means 60. The attachment means 60 are for example bolt-nut assemblies or rivets. The attachment means 60 thus allow the solid attachment of the trim support 40 (and therefore of the side bolster trim 19) on the first pillar 17a.

Therefore, according to the present disclosure, the attachment of the side bolster trim 19 to a pillar of the frame 17 uses only two attachment points.

FIG. 3 further illustrates a side airbag device 36, arranged on the first pillar 17a. Alternatively, the side airbag device 36 can be arranged on the second pillar 17b.

Here, the side airbag device 36 comprises an airbag 44 and an airbag 44 inflation cartridge 46. The airbag 44 and the cartridge 46 are arranged in a pouch 38, or sleeve. The pouch 38 is made of non-woven textile material. The cartridge 46 is in fluid communication with the airbag 44. The pouch 38 is shaped to open in the event the airbag 44 is deployed.

The side airbag device 36 further comprises an airbag support 50, to be arranged on the first pillar 17*a*. The cartridge 46 is for example attached to the airbag support 50, on a plate 51.

The airbag support 50 extends longitudinally in the vertical direction Z, between an upper end of the airbag support 53 and a lower end of the airbag support 52. The airbag support is preferably made of metallic material, such as for example steel. The airbag support 50 is attached to the first pillar 17*a* via the two assembly points 41, 42, also provided for attaching the trim support 40 to the first pillar 17*a*. The first point 41 may be provided toward the upper airbag support end 53 and the second point 42 may be provided toward the lower airbag support end 52. The trim support 40 and the airbag support 50 thus comprise two common assembly points for their common attachment to the first pillar 17*a*. In other words, the airbag support 50 and the trim support 40 are both attached together on the pillar, by common assembly points.

Furthermore, the airbag support 50 is arranged on the trim support 40. It is therefore understood that, once the airbag support 50 and the trim support 40 are attached on the pillar, the trim support 40 is arranged between the airbag support 50 and the pillar. In other words, the airbag support 50 is arranged on the trim support 40, which in turn is arranged on the pillar. The airbag support 50 is therefore superimposed on the trim support 40, which is superimposed on the pillar.

Alternatively, the side airbag device 36 may comprise an intermediate plate (not shown) on which the plate 51 supporting the cartridge 46 is attached. The intermediate plate can for example be made of metal, such as steel for example. The intermediate plate is attached to the airbag support 50. Described another way, the cartridge 46 is attached to the first pillar 17*a* via the intermediate plate, which in turn is attached to the airbag support 50. Provision can also be made for the intermediate plate to have at least one assembly point 41 and/or 42 common to the airbag support 50. f It can thus be noted that the assembly of the trim support 40 and the airbag support 50 on a pillar is particularly easy, since the assembly uses only two assembly points, these points being common, i.e. identical, to the trim support 40 and the airbag support 50. In other words, only the two assembly points 41, 42 allow the trim support 40 and the airbag support 50 to be attached to a pillar of the frame 17.

Alternatively, a deflector 70 can be attached to the first pillar 17*a*. In this case, as visible in FIG. 2, the deflector 70 is arranged above the side airbag device 36. In other words, the deflector 70 envelops the side airbag device 36.

The deflector 70 extends longitudinally in the vertical direction Z, between an upper end of the deflector 73 and a lower end of the deflector 72. The deflector 70 is attached to the first pillar 17*a* via the two assembly points 41, 42, also provided for attaching the trim support 40 and the airbag support 50 to the first pillar 17*a*. The first point 41 may be provided toward the upper deflector support end 73 and the second point 42 may be provided toward the lower deflector support end 72. The trim support 40, the airbag support 50 and the deflector 70 thus comprise two common assembly points for their common attachment to the first pillar 17*a*.

The deflector 70 is configured to direct the deployment of the airbag 44. A border 71, or trim section, is arranged on the deflector 70. The border 71 is further arranged along the inner edge 19*c* of the side bolster 19. The border 71 can be of complementary shape to the inner edge 19*b*, and thus follow the shape of the side bolster trim 19. The airbag 44 deploys along the border 71. Preferably, the deflector 70 may be a one-layer polyurethane coating. The deflector 70 comprises a semi-rigid material, such as polyurethane for example. In the event the airbag 44 is deployed, the border 71, due to the flexibility of the deflector 70, moves away from the run-off line of the side bolster trim 19 to allow the airbag 44 to deploy.

We will now describe a method of assembling the seat back 16 of the vehicle seat. The method is described here with reference to the first pillar 17*a*, but can also be implemented on the second pillar 17*b*.

In general, the method comprises attaching the side bolster to the first pillar 17*a*, including the side bolster trim 19 and the trim support 40 on which the side airbag device 36 is pre-mounted (or pre-assembled). The assembly including the side bolster and the side airbag device 36 is thus attached to the first pillar 17*a* in a single assembly step. The mounting of the side airbag device 36 can therefore be done simultaneously with the attachment of the side bolster (including the trim of the side bolster 19 and the trim support 40) on the first pillar 17*a*. This results in a simplification and time saving of the assembly method of the seat back.

More specifically, the method comprises:
preassembling the side airbag device 36 with the trim support 40. In particular, the side airbag device 36 is placed on the trim support 40 so that the assembly points coincide, that is to say, a single first assembly point 41 and a single second assembly point 42.

Then, the method comprises:
attaching the assembly formed on the one hand by the side bolster, including the trim support 40 and the side bolster trim 19, and on the other hand, the side airbag device 36 on the seat back frame 17. In particular, the first assembly point 41 and the second assembly point 42 of the assembly formed by the trim support 40 and the side airbag device 36 are made to correspond with the upper attachment 26 and the lower attachment 27, respectively, of the first pillar 17*a*. The assembly formed by the trim support 40 and the side airbag device 36 is then attached on the seat back frame 17, using the attachment means 60, provided to cooperate with the first and second assembly points 41, 42, at the upper attachment 26 and the lower attachment 27.

Additionally, the method may comprise:
preassembling the deflector 70 on the assembly formed by the trim support 40 and the side airbag device 36. The deflector 70 is in this case mounted on the trim support 40, above the side airbag device 36. This results in a single first assembly point 41 and a single second assembly point 42. The assembly formed by the trim support 40, the side airbag device 36 and the deflector 70 is then attached as outlined in the previous paragraph.

The method described, according to the present disclosure, therefore makes it possible to prepare, on the one hand, the elements to be attached on a pillar of the seat back frame 17 before, on the other hand, attaching them on the pillar. It is thus not necessary to provide the pillar from the start of the seat back assembly method; the preparatory steps can be prepared at a distance from the frame before attaching, in one piece, the side trim and airbag elements on the pillar of the frame.

A comparative seat back may be provided with a side airbag device. Such a device may be attached to a pillar of the seat back frame. Such a side airbag device may aim to limit the risk of the seat's occupant colliding with the door, or even the central pillar of the passenger compartment of the vehicle, or else may aim to limit the risk of head-to-head impacts of the occupants of two seats arranged transversely one beside the other in the motor vehicle when located on the centermost pillar of the vehicle when located on the other pillar, on the inside.

However, the manufacture of such a comparative seat, in particular comprising positioning the device inside a cover before attaching it to the frame, complicates the assembly of the airbag device. Under these conditions, the side airbag device may be attached in a dedicated mounting step on the pillar of the seat back frame.

It appeared that because of this dedicated mounting step, the assembly of the various elements that constitute the seat back is particularly complex and time-consuming.

In addition, such an airbag device determines the profile of the seat, which makes it necessary to design the seat according to the size of the airbag device.

The present disclosure improves the situation.

Vehicle (10) seat back (16) comprising a seat back frame (17) with a pillar (17a, 17b), an airbag device (36) and a side bolster, the airbag device (36) comprising at least one airbag (44) and an airbag support (50) for attaching the airbag (44) to the seat back frame (17), and the side bolster comprising a side bolster trim (19) and at least one side bolster trim support (40) for attaching the side bolster to the seat back frame (17), wherein the trim support (40) and the airbag support (50) comprise at least one assembly point (41, 42) for their attachment to the pillar (17a, 17b) of the seat back frame (17).

The invention claimed is:

1. A vehicle seat back comprising a seat back frame with a pillar, an airbag device and a side bolster, the airbag device comprising at least one airbag and an airbag support for attaching the airbag to the seat back frame, and the side bolster comprising a side bolster trim and at least one side bolster trim support for attaching the side bolster to the seat back frame, wherein the trim support and the airbag support comprise at least one assembly point for their attachment to the pillar of the seat back frame,
wherein the side bolster trim comprises a run-off line for deployment of the airbag,
wherein the seat back further comprises a deflector attached to the pillar, the deflector comprising a border, the border being arranged along the run-off line, and
wherein, in the event the airbag is deployed, the border, due to the flexibility of the deflector, moves away from the run-off line of the side bolster trim to allow the airbag to deploy.

2. The seat back of claim 1, wherein the trim support, at least at the assembly point, is arranged between the pillar of the seat back frame and the airbag support.

3. The seat back of claim 1, wherein the assembly point is common to the trim support and the airbag support for their joint attachment to the pillar of the seat back frame.

4. The seat back of claim 3, wherein the trim support and the airbag support are attached to the seat back frame, at the assembly point, by common attachment means.

5. The seat back of claim 3, wherein the trim support and the airbag support comprise, for their attachment on the pillar of the seat back frame, two common assembly points: a first point for an upper attachment on the pillar and a second point for a lower attachment on the pillar, the upper attachment being arranged higher than the lower attachment in a vertical direction.

6. The seat back of claim 5, wherein the deflector comprises the two assembly points common to the trim support and the airbag support.

7. The seat back of claim 1, wherein the trim support comprises a guide wall configured to direct the deployment of the airbag toward the run-off line.

8. The seat back of claim 1, wherein the trim support and the airbag support comprise different materials, the trim support preferably being made of plastic material and the airbag support being made of metallic materials.

9. A method of assembling a vehicle seat back comprising a seat back frame, an airbag device comprising at least one airbag and an airbag support for attaching the airbag, and a side bolster comprising a side bolster trim and at least one side bolster trim support for its attachment to the seat back frame, wherein an assembly point is common to the trim support and the airbag support, the seat back further comprising a deflector, the method comprising
preassembling the airbag support of the airbag device with the trim support of the side bolster by matching the common assembly point between the trim support and the airbag support,
preassembling the deflector on the assembly formed, on the one hand, by the side bolster comprising the side bolster trim and the trim support and, on the other hand, the airbag device,
attaching the assembly formed by the side bolster, the airbag device and the deflector on the seat back frame by the at least one common assembly point of the trim support and the airbag support for their attachment on the pillar of the seat back frame.

10. A motor vehicle seat comprising a seat bottom with a seat bottom frame and a seat back according to claim 1.

11. The method of claim 9, wherein the vehicle seat further comprises a seat bottom with a seat bottom frame.

12. A vehicle seat back comprising a seat back frame with a pillar, an airbag device and a side bolster, the airbag device comprising at least one airbag and an airbag support for attaching the airbag to the seat back frame, and the side bolster comprising a side bolster trim and at least one side bolster trim support for attaching the side bolster to the seat back frame, wherein the trim support and the airbag support comprise at least one assembly point for their attachment to the pillar of the seat back frame,
wherein the assembly point is common to the trim support and the airbag support for their joint attachment to the pillar of the seat back frame,
wherein the trim support and the airbag support comprise, for their attachment on the pillar of the seat back frame, two common assembly points: a first point for an upper attachment on the pillar and a second point for a lower attachment on the pillar, the upper attachment being arranged higher than the lower attachment in a vertical direction,
further comprising a deflector attached to the pillar, the deflector comprising the two assembly points common to the trim support and the airbag support, the deflector being structurally independent from the trim support and the airbag support.

* * * * *